(12) United States Patent
Nishimura et al.

(10) Patent No.: US 9,340,158 B2
(45) Date of Patent: May 17, 2016

(54) OUTER MIRROR

(71) Applicant: MURAKAMI CORPORATION, Shizuoka (JP)

(72) Inventors: Eiichi Nishimura, Shizuoka (JP); Toru Shimura, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 0 days.

(21) Appl. No.: 14/410,813

(22) PCT Filed: Jun. 14, 2013

(86) PCT No.: PCT/JP2013/066491
§ 371 (c)(1),
(2) Date: Dec. 23, 2014

(87) PCT Pub. No.: WO2014/002802
PCT Pub. Date: Jan. 3, 2014

(65) Prior Publication Data
US 2015/0321608 A1     Nov. 12, 2015

(30) Foreign Application Priority Data

Jun. 29, 2012  (JP) ................................. 2012-147642
Nov. 2, 2012   (JP) ................................. 2012-242789

(51) Int. Cl.
*B60R 1/06*     (2006.01)

(52) U.S. Cl.
CPC ........................................ *B60R 1/06* (2013.01)

(58) Field of Classification Search
CPC .................................... B60R 1/06; B60R 1/07
USPC .................................. 359/841, 871, 872, 877
See application file for complete search history.

(56) References Cited

U.S. PATENT DOCUMENTS

| 4,322,132 | A | * | 3/1982 | Derr | ........................ | B60R 1/06 |
| | | | | | | 359/844 |
| 4,626,085 | A | * | 12/1986 | Suzuki | ................ | G02B 7/1827 |
| | | | | | | 359/841 |
| 6,132,050 | A | * | 10/2000 | Sakata | ...................... | B60R 1/07 |
| | | | | | | 248/478 |

(Continued)

FOREIGN PATENT DOCUMENTS

CN      101544208      9/2009
JP      59-79438       5/1984

(Continued)

OTHER PUBLICATIONS

International Search Report for PCT/JP2013/066491 having a mail date of Sep. 17, 2013.

(Continued)

*Primary Examiner* — Ricky D Shafer
(74) *Attorney, Agent, or Firm* — Greenblum & Bernstein, P.L.C.

(57) ABSTRACT

An aspect of the present invention is an outer mirror in which an outer mirror main body is attached to an outer mirror attaching part of a vehicle body via an outer mirror base, characterized in that the outer mirror base has a shared base main body configured to support the outer mirror main body, and an exclusive spacer having one end abutting the shared base main body and the other end pressed against the outer mirror attaching part of the vehicle body via a gasket, wherein the exclusive spacer abuts and is fixed to the shared base main body, and an attaching screw passing through the outer mirror attaching part is threadedly attached to the exclusive spacer.

4 Claims, 10 Drawing Sheets

(56) References Cited

U.S. PATENT DOCUMENTS

| | | | | |
|---|---|---|---|---|
| 6,239,928 | B1* | 5/2001 | Whitehead | B60R 1/078 359/871 |
| 6,793,358 | B2* | 9/2004 | Sakata | B60R 1/074 359/841 |
| 7,055,974 | B1* | 6/2006 | Matsuura | B60R 1/06 359/850 |
| 7,216,996 | B2* | 5/2007 | Rehill | B60R 1/06 359/879 |
| 7,758,010 | B2* | 7/2010 | Tanaka | B60R 1/06 248/475.1 |
| 8,342,702 | B2* | 1/2013 | Ohe | B60R 1/06 296/1.11 |
| 2002/0048100 | A1* | 4/2002 | Hoek | B60R 1/076 248/476 |
| 2004/0057139 | A1* | 3/2004 | Shinohara | B60R 1/072 359/877 |
| 2006/0132944 | A1 | 6/2006 | Matsuura et al. | |
| 2009/0279195 | A1 | 11/2009 | Itoh et al. | |
| 2012/0235009 | A1* | 9/2012 | Horie | B60R 13/00 248/475.1 |
| 2015/0138658 | A1* | 5/2015 | Nishimura | B60R 1/07 359/871 |

FOREIGN PATENT DOCUMENTS

| | | |
|---|---|---|
| JP | 61-190742 | 11/1986 |
| JP | 7-1684 | 1/1995 |
| JP | 8-142754 | 6/1996 |
| JP | 9-95180 | 4/1997 |
| JP | 3061552 | 6/1999 |
| JP | 2006-168648 | 6/2006 |
| JP | 2005-194832 | 7/2006 |
| JP | 2007-331601 | 12/2007 |

OTHER PUBLICATIONS

International Preliminary Report on Patentability for PCT/JP2013/066491 having a mail date of Jan. 8, 2015.

U.S. Appl. No. 14/410,871 to Nishmura et al., filed Dec. 23, 2014.

* cited by examiner

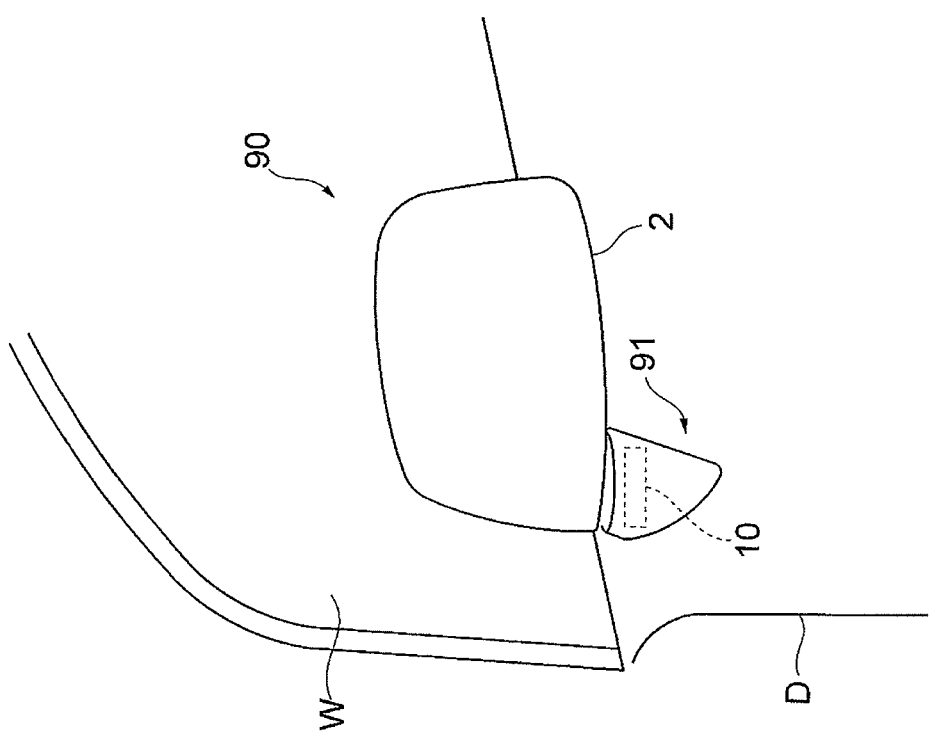

OUTER MIRROR

TECHNICAL FIELD

The present invention relates to an outer mirror, and particularly, a door mirror in which a door mirror main body is attached to a door of a vehicle body via a door mirror base.

BACKGROUND ART

In the related art, a technology of this field is disclosed in Japanese Published Unexamined Patent Application No. 2007-331601. In this disclosure, a mirror base including a base main body configured to support a mirror assembly (a door mirror main body) and a gasket installed at a back surface of the base main body is disclosed. The mirror base is installed between a door mirror attaching part formed at a vehicle body and a mirror assembly, and the base main body of the mirror base has a fixing part fixed to the door mirror attaching part. The fixing part protrudes toward the vehicle body in a horizontal direction, and butts against the door mirror attaching part via a gasket. Screws are threadedly inserted into a plurality of bosses formed at the fixing part of the base main body from the door mirror attaching part side, and thus the mirror base is fixed to the door mirror attaching part. In addition, a lower end of a door mirror opening and closing unit housed in the mirror assembly (the door mirror main body) is fixed to the base main body by a screw.

CITATION LIST

Patent Literature

[Patent Literature 1] Japanese Published Unexamined Patent Application No. 2007-331601

SUMMARY OF INVENTION

Technical Problem

However, in the above-mentioned door mirror of the related art, even when the door mirror main body is meant to be shared for different types of vehicles, an attaching structure, an attaching angle, or the like, of the door mirror attaching part installed at the vehicle body is varied. As a result, the base main body should be exclusively designed for every type of vehicle, and thus a general shape or a structure of the base main body should be reconsidered.

The present invention is directed to provide an outer mirror capable of sharing of a base main body to which an outer mirror main body is attached.

Solution to Problem

An aspect of the present invention provides an outer mirror in which an outer mirror main body is attached to an outer mirror attaching part of a vehicle body via an outer mirror base, characterized in that the outer mirror base has: a shared base main body configured to support the outer mirror main body; and an exclusive spacer having one end abutting the shared base main body and the other end pressed against the outer mirror attaching part of the vehicle body via a gasket, wherein the exclusive spacer abuts and is fixed to the shared base main body, and an attaching screw passing through the outer mirror attaching part is threadedly attached to the exclusive spacer.

In the outer mirror, the outer mirror main body that can be shared in different types of vehicles and the shared base main body (hereinafter referred to as a "shared base main body") are employed without modifying the outer mirror main body and the base main body for every type of vehicle. Since the outer mirror main body is constituted by assembling various parts and accounts for most of a manufacturing cost of the outer mirror, the cost can be largely reduced when the outer mirror main body is shared. However, while the sharing of the outer mirror main body is generally performed, in order to further reduce the cost, in the one aspect of the present invention, sharing of the base main body to which the outer mirror main body is attached is attempted. When the sharing of the base main body is attempted, the outer mirror attaching part of the vehicle body side should be exclusively designed to match the structure or shape of the shared base main body, and thus no freedom is provided in the structure or shape of the outer mirror attaching part of the vehicle body side, and free design of the vehicle body may be restricted.

The aspect of the present invention has the exclusive spacer having one end abutting the shared base main body and the other end pressed against the outer mirror attaching part of the vehicle body via the gasket. The exclusive spacer abuts and is fixed to the shared base main body, and the attaching screw passing through the outer mirror attaching part is threadedly attached to exclusive spacer. By employing the above-mentioned configuration, since only the exclusive spacer should be exclusively designed for each type of vehicle without necessity of exclusive design of the base main body for each type of vehicle, easy design, cost reduction and production of narrow variety of molding equipment become possible. In addition, since the exclusive spacer is not connected to the outer mirror main body like the shared base main body, there is no need to consider the connecting structure, and thus the structure can be simplified.

An aspect of the present invention provides an outer mirror in which an outer mirror main body is attached to an outer mirror attaching part of a vehicle body via an outer mirror base, characterized in that the outer mirror base has: a shared base main body configured to support the outer mirror main body; and an exclusive spacer having one end abutting the shared base main body and the other end pressed against the outer mirror attaching part of the vehicle body via a gasket, wherein the exclusive spacer abuts and is fixed to the shared base main body, and an attaching screw passing through the outer mirror attaching part is fixed to the exclusive spacer.

In the outer mirror, the outer mirror main body that can be shared for different types of vehicle and the shared base main body (hereinafter referred to as a "shared base main body") are employed without modifying the outer mirror main body and the base main body for every type of vehicle. Since the outer mirror main body is constituted by assembling various parts and accounts for most of a manufacturing cost of the outer mirror, the cost can be largely reduced when the outer mirror main body is shared. However, while the sharing of the outer mirror main body is generally performed, in order to further reduce the cost, in the one aspect of the present invention, sharing of the base main body to which the outer mirror main body is attached is attempted. When the sharing of the base main body is attempted, the outer mirror attaching part of the vehicle body side should be exclusively designed to match the structure or shape of the shared base main body, and thus no freedom is provided in the structure or shape of the outer mirror attaching part of the vehicle body side, and free design of the vehicle body may be restricted.

The aspect of the present invention has the exclusive spacer having one end abutting the shared base main body and the other end pressed against the outer mirror attaching part of the vehicle body via the gasket. The exclusive spacer abuts and is fixed to the shared base main body, and the attaching screw passing through the outer mirror attaching part is fixed to exclusive spacer. By employing the above-mentioned configuration, since only the exclusive spacer should be exclusively designed for each type of vehicle without necessity of exclusive design of the base main body for each type of vehicle, easy design, cost reduction and production of narrow variety of molding equipment become possible. In addition, since the exclusive spacer is not connected to the outer mirror main body like the shared base main body, there is no need to consider the connecting structure, and thus the structure can be simplified.

An aspect of the present invention provides an outer mirror in which an outer mirror main body is attached to an outer mirror attaching part of a vehicle body via an outer mirror base, characterized in that the outer mirror base has: a shared base main body configured to support the outer mirror main body; and an exclusive spacer having one end abutting the shared base main body and the other end pressed against the outer mirror attaching part of the vehicle body via a gasket, wherein a screw through-hole through which an attaching screw passing through the outer mirror attaching part and threadedly attached or fixed to the shared base main body passes is formed in the exclusive spacer.

In the outer mirror, the outer mirror main body that can be shared for different types of vehicles and the shared base main body (hereinafter referred to as a "shared base main body") are employed without modifying the outer mirror main body and the base main body for every type of vehicle. Since the outer mirror main body is constituted by assembling various parts and accounts for most of a manufacturing cost of the outer mirror, the cost can be largely reduced when the outer mirror main body is shared. However, while the sharing of the outer mirror main body is generally performed, in order to further reduce the cost, in the one aspect of the present invention, sharing of the base main body to which the outer mirror main body is attached is attempted. When the sharing of the base main body is attempted, the outer mirror attaching part of the vehicle body side should be exclusively designed to match the structure or shape of the shared base main body, and thus no freedom is provided in the structure or shape of the outer mirror attaching part of the vehicle body side, and free design of the vehicle body may be restricted.

The aspect of the present invention has the exclusive spacer having one end abutting the shared base main body and the other end pressed against the outer mirror attaching part of the vehicle body via the gasket. The screw through-hole through which the attaching screw passing through the outer mirror attaching part and threadedly attached or fixed to the shared base main body passes is formed in the exclusive spacer. By employing the above-mentioned configuration, since only the exclusive spacer should be exclusively designed for each type of vehicle without necessity of exclusive design of the base main body for each type of vehicle, easy design, cost reduction and production of narrow variety of molding equipment become possible. In addition, since the exclusive spacer is not connected to the outer mirror main body like the shared base main body, there is no need to consider the connecting structure, and thus the structure can be simplified. In addition, the exclusive spacer and the shared base main body can be connected by the attaching screw.

An aspect of the present invention provides an outer mirror in which an outer mirror main body is attached to an outer mirror attaching part of a vehicle body via an outer mirror base, characterized in that the outer mirror base has: a shared base main body configured to support the outer mirror main body; and an exclusive spacer having one end abutting the shared base main body and the other end pressed against the outer mirror attaching part of the vehicle body via a gasket, wherein a fixing means configured to fix the outer mirror base to the outer mirror attaching part has: an anchor passing through the shared base main body and the exclusive spacer to arrive at the outer mirror attaching part; and an attaching screw screw-inserted into the anchor while expanding the anchor and configured to press an outer circumferential surface of the anchor against the shared base main body, the exclusive spacer and the outer mirror attaching part.

In the outer mirror, the outer mirror main body that can be shared for different types of vehicles and the shared base main body (hereinafter referred to as a "shared base main body") are employed without modifying the outer mirror main body and the base main body for every type of vehicle. Since the outer mirror main body is constituted by assembling various parts and accounts for most of a manufacturing cost of the outer mirror, the cost can be largely reduced when the outer mirror main body is shared. However, while the sharing of the outer mirror main body is generally performed, in order to further reduce the cost, in the one aspect of the present invention, sharing of the base main body to which the outer mirror main body is attached is attempted. When the sharing of the base main body is attempted, the outer mirror attaching part of the vehicle body side should be exclusively designed to match the structure or shape of the shared base main body, and thus no freedom is provided in the structure or shape of the outer mirror attaching part of the vehicle body side, and free design of the vehicle body may be restricted.

The aspect of the present invention has the exclusive spacer having one end abutting the shared base main body and the other end pressed against the outer mirror attaching part of the vehicle body via the gasket, and includes the fixing means configured to fix the outer mirror base to the outer mirror attaching part. Then, the fixing means has the anchor passing through the shared base main body and the exclusive spacer to arrive at the outer mirror attaching part; and the attaching screw screw-inserted into the anchor while expanding the anchor and configured to press the outer circumferential surface of the anchor against the shared base main body, the exclusive spacer and the outer mirror attaching part. By employing the above-mentioned configuration, since only the exclusive spacer should be exclusively designed for each type of vehicle without necessity of exclusive design of the base main body for each type of vehicle, easy design, cost reduction and production of narrow variety of molding equipment become possible. In addition, since the exclusive spacer is not connected to the outer mirror main body like the shared base main body, there is no need to consider the connecting structure, and thus the structure can be simplified. In addition, the exclusive spacer and the shared base main body can be connected by the attaching screw. Further, by employing the above-mentioned fixing means, a good effect is exhibited to facilitate sharing of the fixing means with respect to the outer mirror attaching part having various inclined angles.

Advantageous Effects of Invention

An aspect of the present invention enables sharing of the base main body to which the outer mirror main body is attached.

BRIEF DESCRIPTION OF DRAWINGS

FIG. 10 is a perspective view showing a seventh variant of the door mirror according to the present invention.

DESCRIPTION OF EMBODIMENT

Hereinafter, an appropriate embodiment of an outer mirror according to the present invention will be described in detail with reference to the accompanying drawings.

Figure 1:
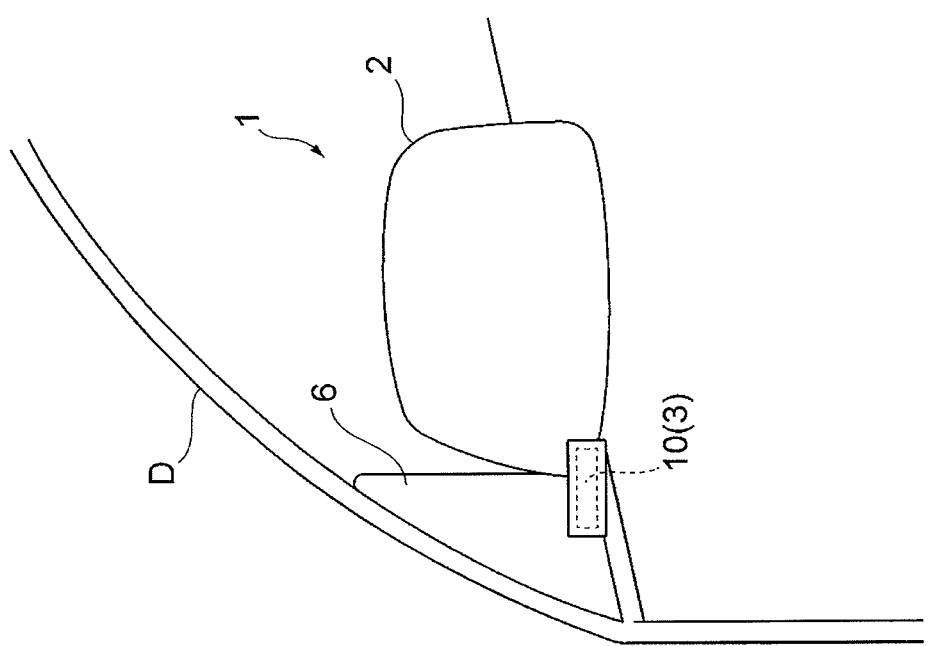
FIG. 1 is a perspective view of a door mirror that forms an embodiment of an outer mirror according to the present invention.

As shown in FIG. 1, a door mirror 1 serving as one example of the outer mirror has a motor-driven door mirror main body (an outer mirror main body) 2 provided with a door mirror opening and closing unit 5 (see FIG. 3) that enables opening and closing and a mirror angle adjustment unit configured to adjust a tilting angle of a mirror surface, and a door mirror base (an outer mirror base) 3 used to attach the door mirror main body 2 to a door D. The door mirror main body 2 having the same shape and the same structure, which is shared, is used for different types of vehicles. By sharing the door mirror main body 2, cost reduction and production of narrow variety of molding equipment become possible.

Figure 2:
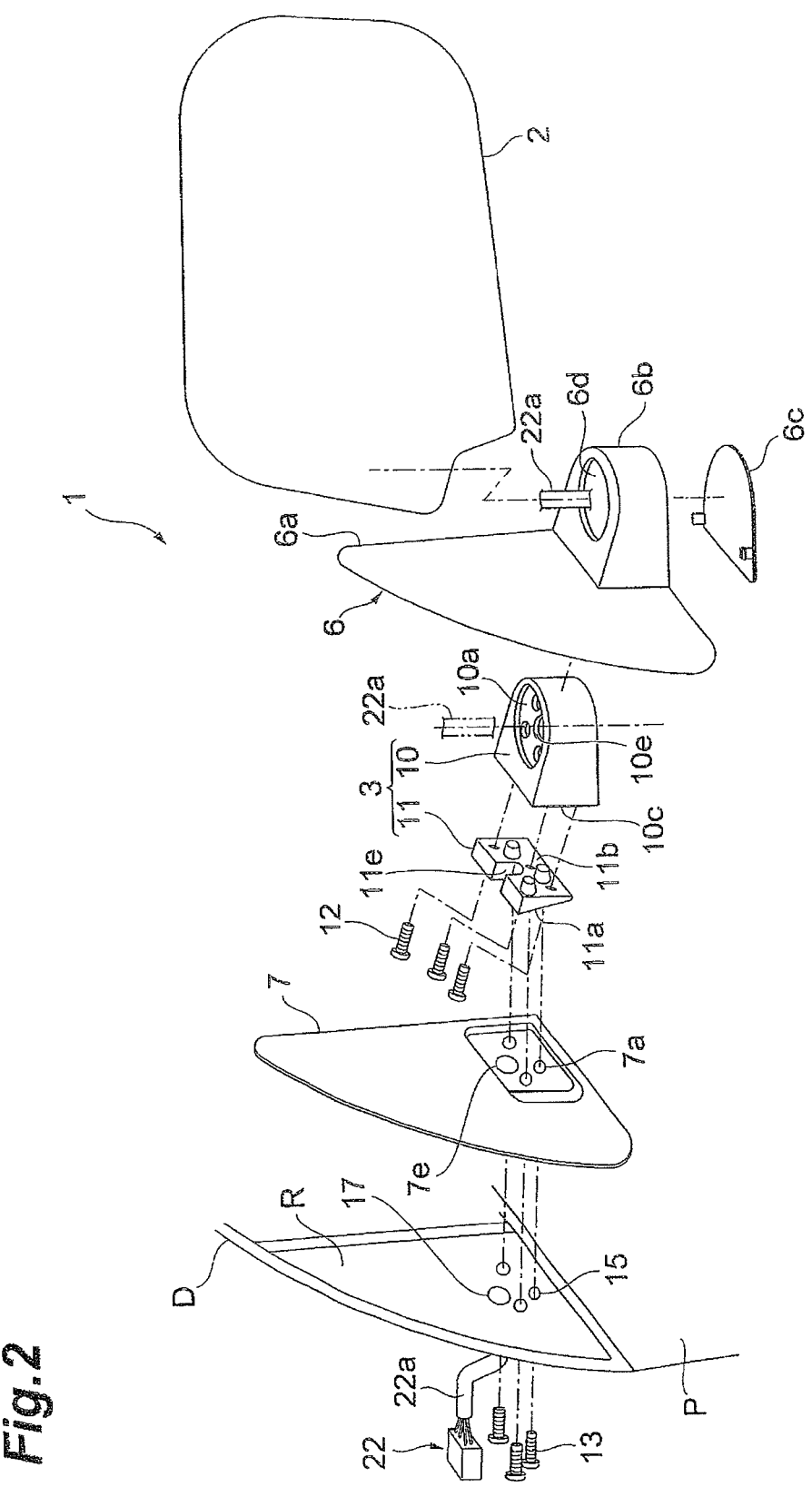
FIG. 2 is an exploded perspective view of the door mirror shown in FIG. 1.

As shown in FIG. 2, a door mirror attaching part (an outer mirror attaching part) R having a triangular shape formed at the door D is integrated with an outer panel P of the door D by welding, and the door mirror 1 is fixed to the door mirror attaching part R. The door mirror 1 includes a cover member 6 configured to cover the door mirror attaching part R for use as a decoration, a gasket 7 sandwiched between the door mirror base 3 and the door mirror attaching part R, and an attaching screw 13 configured to fix the door mirror base 3 to the door mirror attaching part R.

Figure 3:
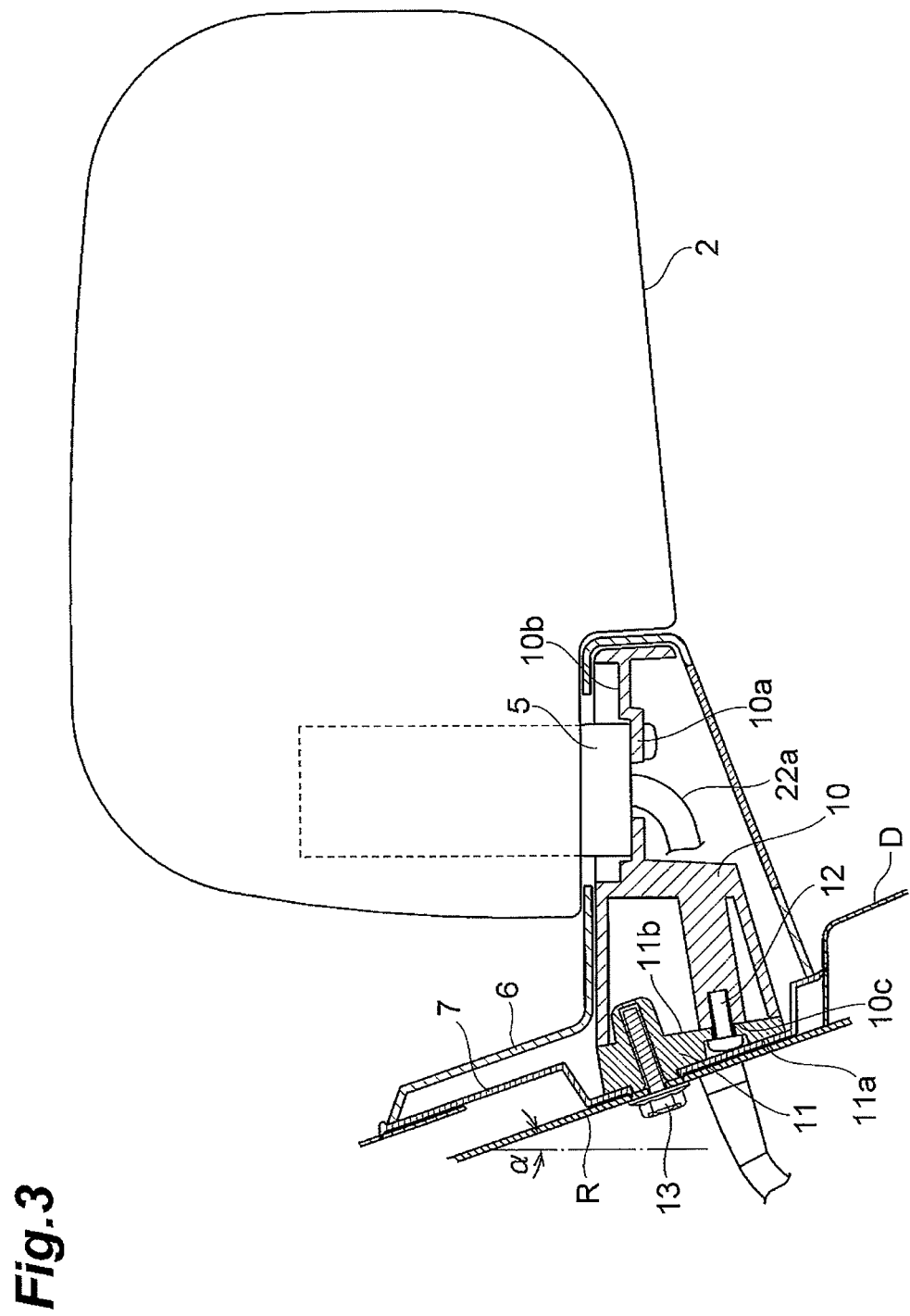
FIG. 3 is a cross-sectional view of the door mirror shown in FIG. 1.

As shown in FIGS. 2 and 3, the door mirror base 3 has a shared base main body 10 configured to support the shared door mirror main body 2, and an exclusive spacer 11 having one end abutting the shared base main body 10 and the other end pressed against the door mirror attaching part R of the door D via the gasket 7.

The shared base main body 10 having the same shape and the same structure, which is shared, is used for different types of vehicles. By sharing the base main body 10, cost reduction and production of narrow variety of molding equipment become possible. A pedestal part 10a at which the lower end of the door mirror opening and closing unit 5 of the door mirror main body 2 is positioned to be fixed by a screw is installed at the shared base main body 10. The shared base main body 10 protrudes from the door D in the horizontal direction, and the pedestal part 10a is formed in a concave shape at an upper surface 10b extending in the horizontal direction. The pedestal part 10a may also be formed in a convex shape at the upper surface 10b extending in the horizontal direction.

An end surface 10c of the door D side of the shared base main body 10 extends to form a predetermined angle with respect to the upper surface 10b, and abuts the exclusive spacer 11 formed of a resin or metal, which is exclusively designed for each type of vehicle. The exclusive spacer 11 has an inner abutting surface 11a having one end pressed against the door mirror attaching part R of the door D via the gasket 7, and an outer abutting surface 11b having the other end abutting the end surface 10c of the door D side of the shared base main body 10. Then, the inner abutting surface 11a of the exclusive spacer 11 directly abuts the gasket 7.

Figure 4:
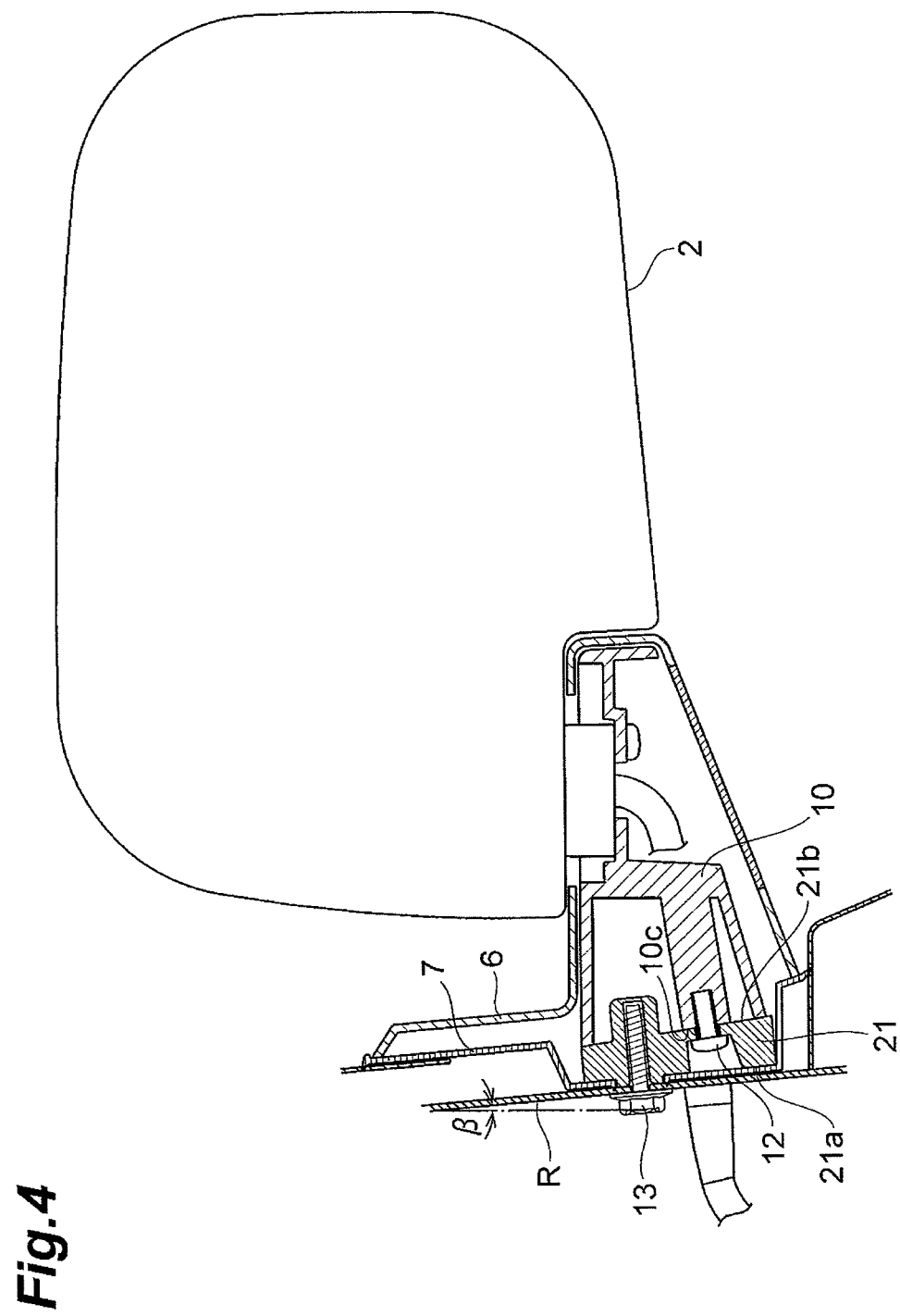
FIG. 4 is a cross-sectional view showing a first variant of the door mirror according to the present invention.

The gasket 7 is formed of a plate-shaped thin polyethylene resin, and the inner abutting surface 11a of the exclusive spacer 11 has a shape that matches an inclined angle α of the door mirror attaching part R in consideration of a shape of the gasket 7. In addition, as shown in FIG. 4, with respect to another type of vehicle, an inner abutting surface 21a of an exclusive spacer 21 has a shape that matches an inclined angle β of the door mirror attaching part R in consideration of the shape of the gasket 7. The inclined angles α and β are angles with respect to a vertical surface.

In addition, in comparison with the outer abutting surface 11b of the exclusive spacer 11 shown in FIG. 3 and an outer abutting surface 21b of the exclusive spacer 21 shown in FIG. 4, since the shared base main body 10 having the same shape and the same structure, which is shared, is used for different types of vehicles with any one of the exclusive spacers 11 and 21, the same shape and the same structure, which are shared, are provided for every type of vehicle. In addition, thicknesses, materials and sizes of the exclusive spacers 11 and 21 are different for each type of vehicle.

As shown in FIG. 3, the exclusive spacer 11 is fixed to the shared base main body 10 by a screw 12, and the attaching screw 13 passing through through-holes 15 of the door mirror attaching part R and through-holes 7a of the gasket 7 from the inside is threadedly attached to the exclusive spacer 11. Accordingly, the door mirror base 3 is fixed to the door mirror attaching part R. When the attaching screw 13 is threadedly attached, a female thread part may be formed at the exclusive spacer 11. Or the attaching screw 13 may be screwed in a prepared hole formed in the exclusive spacer 11.

As described above, the door mirror 1 has a fixing means configured to fix the door mirror base 3 constituted by the shared base main body 10 and the exclusive spacers 11 and 21 to the door mirror attaching part R. The fixing means has the screw 12, the through-holes 15, the through-holes 7a, and the attaching screw 13.

Figure 5:
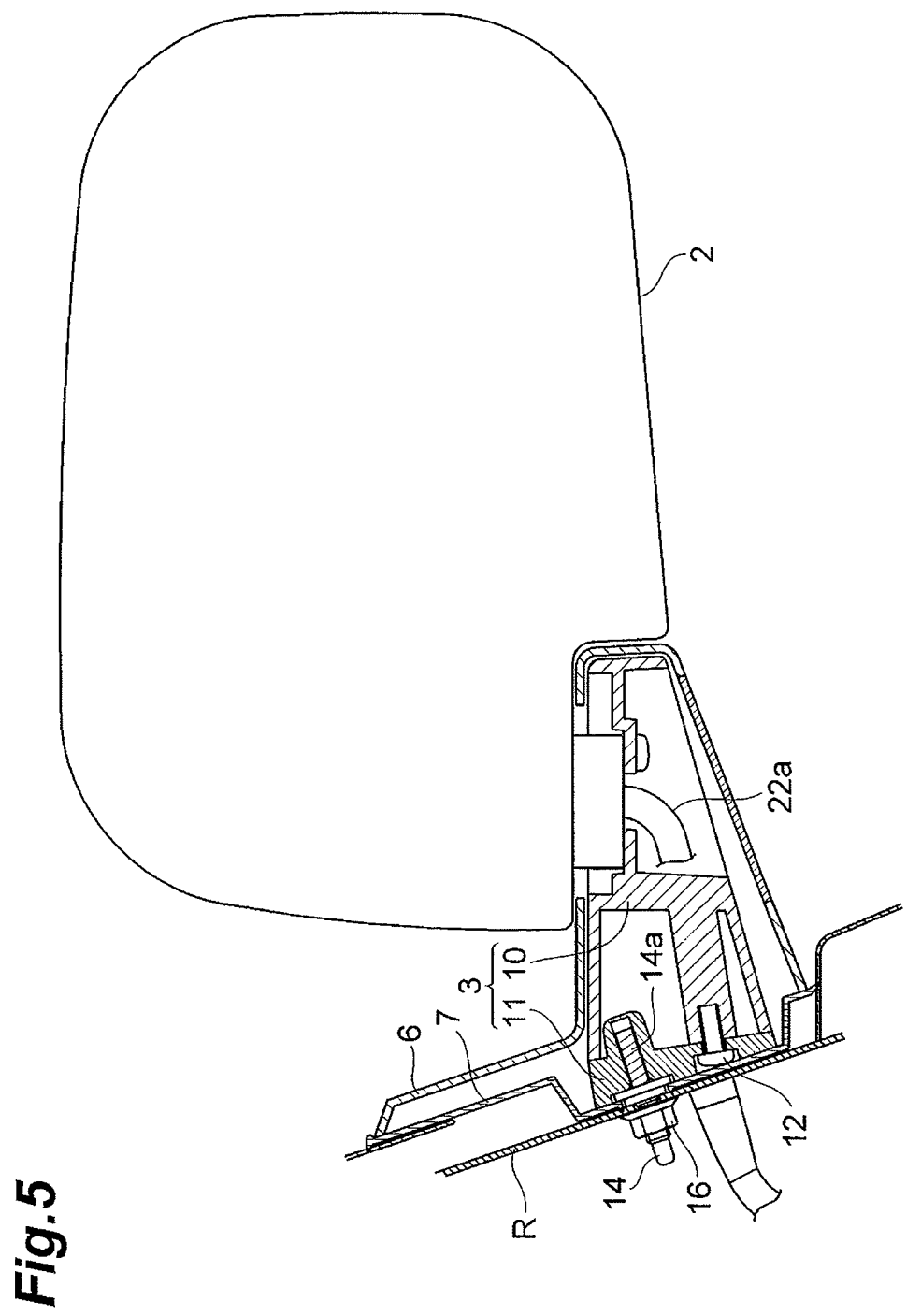
FIG. 5 is a cross-sectional view showing a second variant of the door mirror according to the present invention.

As shown in FIG. 5, a base part 14a of an attaching screw 14 is implanted in the exclusive spacer 11. The attaching screw 14 fixed to the exclusive spacer 11 passes through the door mirror attaching part R and the gasket 7 to be inserted into the inside from the outside, and the door mirror base 3 is fixed to the door mirror attaching part R by fastening the nut 16 to the attaching screw 14 through threaded attachment of a nut 16.

As shown in FIGS. 2 and 3, the cover member 6 for decoration is constituted by a main body part 6a corresponding to a shape of the gasket 7, a base surrounding part 6b configured to cover a periphery of the shared base main body 10, and a lid plate 6c configured to close a lower surface opening part of the base surrounding part 6b. The lid plate 6c is used when the lower end of the door mirror opening and closing unit 5 of the door mirror main body 2 is screw-stopped at the pedestal part 10a of the shared base main body 10.

In addition, a cord 22a of a harness 22 is pulled from the door mirror opening and closing unit 5 of the door mirror main body 2 to the outside, and the cord 22a is guided into the door D through a pedestal exposing opening 6d formed at the base surrounding part 6b of the cover member 6, a cord insertion hole 10e formed in the pedestal part 10a of the shared base main body 10, a U-shaped cutout cord insertion hole 11e formed in the exclusive spacer 11, a cord insertion hole 7e formed in the gasket 7, and a cord insertion hole 17 formed in the door mirror attaching part R. The cord 22a can easily pass through the cord insertion hole 10e as the cord insertion hole 10e has a slit shape instead of a round hole. The cord insertion hole 10e may be cut from any one of upper, lower, left and right ends of the shared base main body 10 toward the inside.

In the door mirror 1, the door mirror main body 2 and the shared base main body 10 that are capable of sharing for different types of vehicles are employed without modifying the door mirror main body 2 and the base main body 10 for each type of vehicle. Since the door mirror main body 2 is configured by assembling various parts and accounts for most of a manufacturing cost of the door mirror 1, large cost reduction becomes possible when the door mirror main body 2 is shared. However, while the sharing of the door mirror main body 2 is generally performed, in order to further reduce the cost, the sharing of the base main body 10 to which the door mirror main body 2 is attached is attempted. When the sharing of the base main body 10 is attempted, the door mirror attaching part R of the vehicle body side should be exclusively designed to match the structure or shape of the shared base main body 10, and thus no freedom is provided in the structure or shape of the door mirror attaching part R of the vehicle body side, and free design of the vehicle body may be restricted.

Here, in the above-mentioned door mirror 1, since only the exclusive spacer 11 should be exclusively designed for each type of vehicle without necessity of exclusive design of the base main body 10 for each type of vehicle, easy design, cost reduction and production of narrow variety of molding equipment become possible. In addition, since the exclusive spacer 11 is not connected to the door mirror main body 2 like the shared base main body 10, there is no need to consider the connecting structure, and thus the structure can be simplified.

The present invention is not limited to the above-mentioned embodiment but various modifications may be made without departing from the spirit of the present invention.

Figure 6:
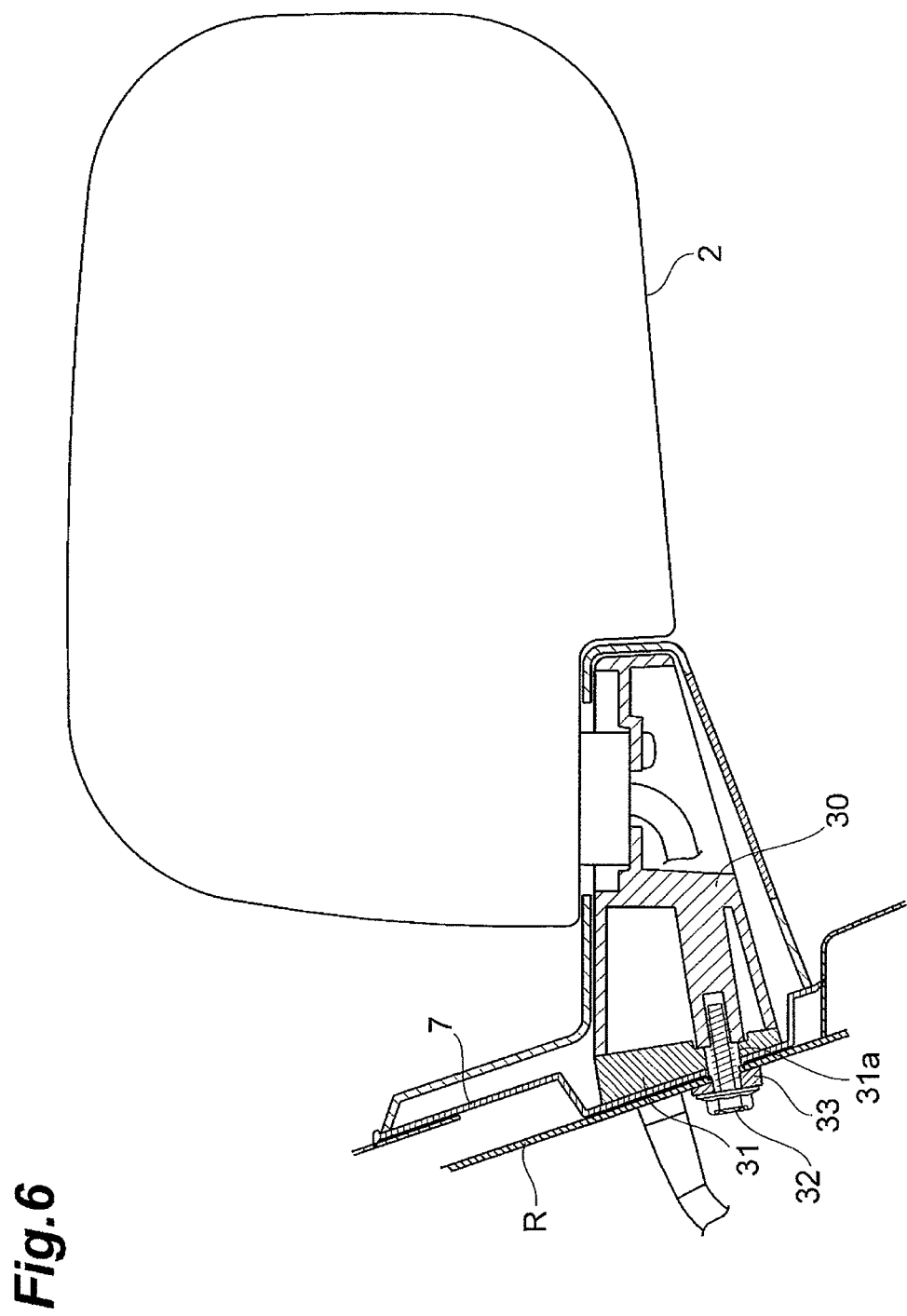
FIG. 6 is a cross-sectional view showing a third variant of the door mirror according to the present invention.

As shown in FIG. 6, a screw through-hole 31a is formed in an exclusive spacer 31, and an attaching screw 32 is threadedly attached to a shared base main body 30 through the door mirror attaching part R, the gasket 7 and the screw through-hole 31a of the exclusive spacer 31. Accordingly, there is no need to apply a screw or an adhesive agent for fixing the exclusive spacer 31 to the shared base main body 30. When the attaching screw 32 is threadedly attached, a female thread part may be formed at the shared base main body 30. Or the attaching screw 32 may be screwed in a prepared hole formed in the shared base main body 30. Further, reference numeral 33 is an auxiliary spacer configured to secure sitting stability of the head of the attaching screw 32.

As described above, the door mirror 1 has a fixing means configured to fix the door mirror base 3 constituted by the shared base main body 30 and the exclusive spacer 31 to the door mirror attaching part R. The fixing means has the attaching screw 32 and the screw through-hole 31a.

Figure 7:
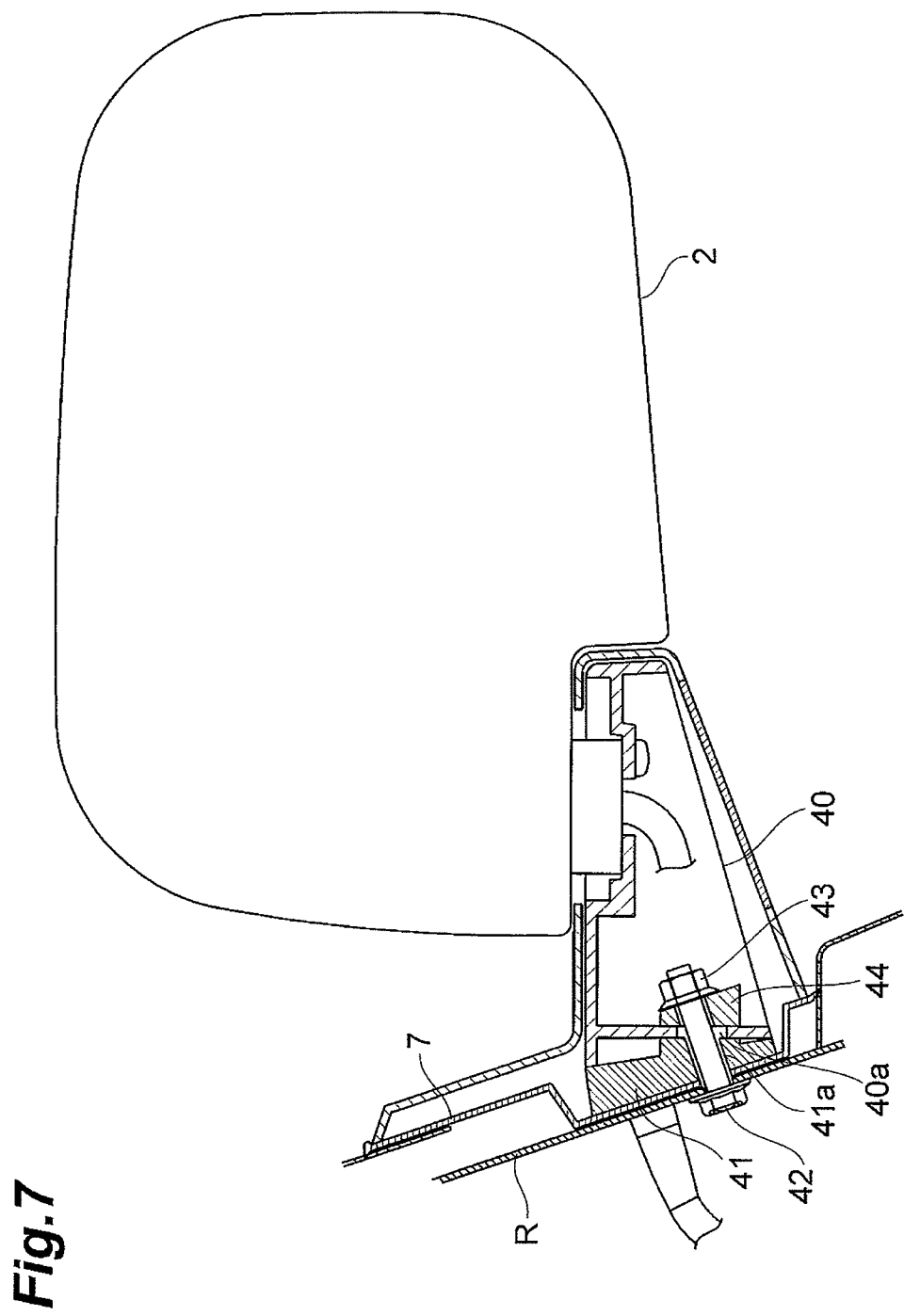
FIG. 7 is a cross-sectional view showing a fourth variant of the door mirror according to the present invention.

As shown in FIG. 7, screw through-holes 40a and 41a are formed in a shared base main body 40 and an exclusive spacer 41, and an attaching screw 42 passes through the door mirror attaching part R, the gasket 7, the screw through-hole 40a of the shared base main body 40 and the screw through-hole 41a of the exclusive spacer 41, and is fixed to the shared base main body 40 by a nut 43. Accordingly, there is no need to apply a screw or an adhesive agent to fix the exclusive spacer 41 to the shared base main body 40. Further, reference numeral 44 is an auxiliary spacer configured to secure sitting stability of the head of the nut 43.

As described above, the door mirror 1 has a fixing means configured to fix the door mirror base 3 constituted by the shared base main body 40 and the exclusive spacer 41 to the door mirror attaching part R. The fixing means has the attaching screw 42, the screw through-hole 40a, and the screw through-hole 41a.

Figure 8:
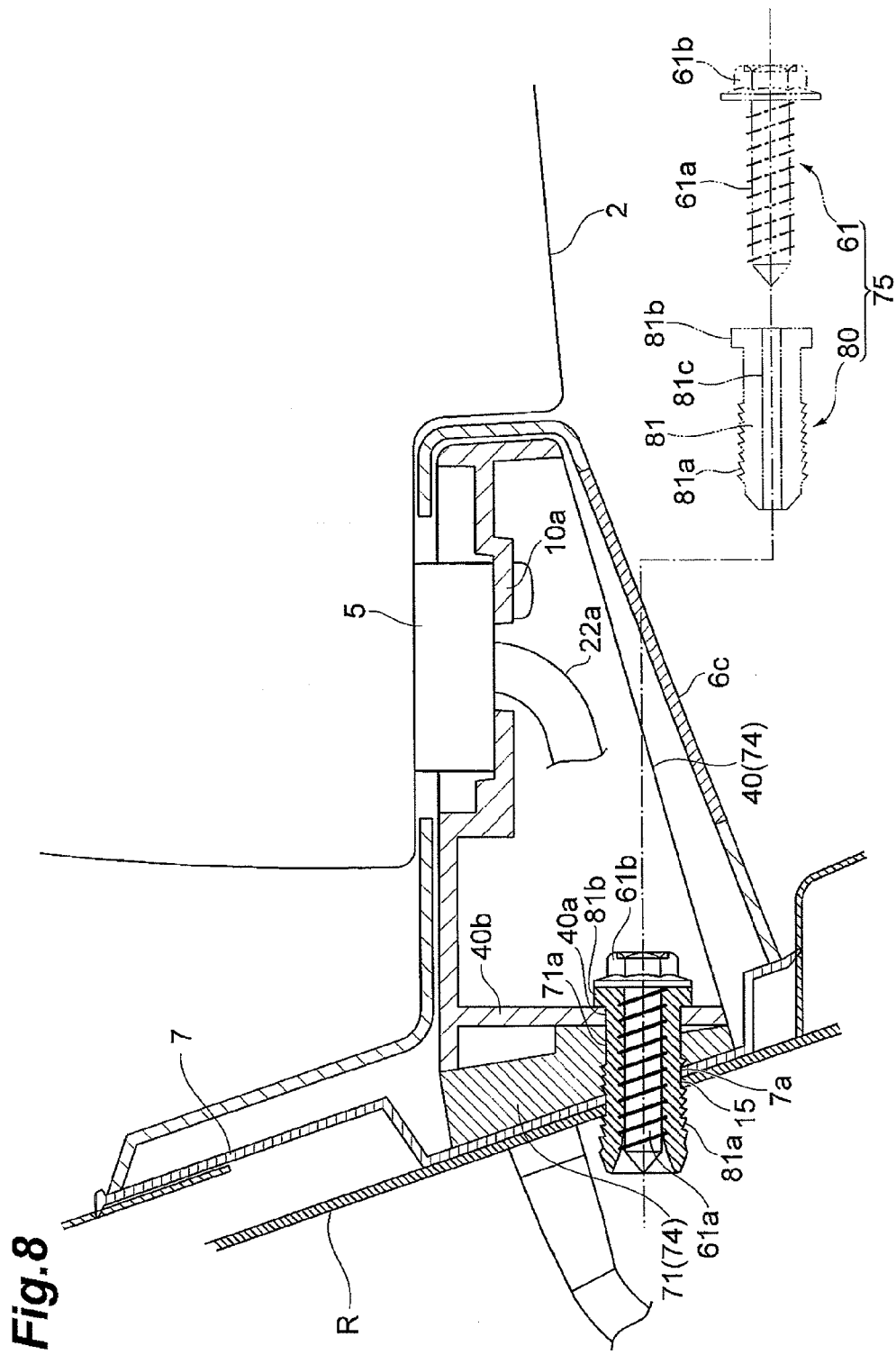
FIG. 8 is a perspective view showing a fifth variant of the door mirror according to the present invention.

As shown in FIG. 8, a first through-hole 40a is formed in a base end wall 40b of the shared base main body 40, and a second through-hole 71a extending in the horizontal direction to coincide with the first through-hole 40a is formed in an exclusive spacer 71. Further, third and fourth through-holes 15 and 7a are formed in the door mirror attaching part R and the gasket 7 to coincide with the second through-hole 71a.

In addition, a door mirror base 74 constituted by the shared base main body 40 and the exclusive spacer 71 is fixed to the door mirror attaching part R by a fixing means 75. The fixing means 75 is constituted by a resin anchor 80 inserted through the first through-hole 40a of the shared base main body 40, the second through-hole 71a of the exclusive spacer 71 and the third and fourth through-holes 15 and 7a of the door mirror attaching part R and the gasket 7, and an attaching screw 61 screw-inserted into the anchor 80.

The resin anchor 80 has an anchor main body part 81 extending in the axial direction, a saw-blade-shaped stopping part 81a formed at a forward side of the outer circumferential surface of the anchor main body part 81, a flange part 81b formed at a rear end of the anchor main body part 81, and a screw insertion hole 81c extending from a center of the anchor main body part 81 in the axial direction. The screw insertion hole 81c has a diameter smaller than that of a shaft part 61a of the attaching screw 61, a diameter of the anchor main body part 81 is increased by screw-inserting the shaft part 61a of the attaching screw 61 into the screw insertion hole 81c, and in particular, a diameter of a distal end side of the anchor main body part 81 can be increased.

In a state in which the door mirror base 74 constituted by the shared base main body 40 and the exclusive spacer 71 is pressed against the door mirror attaching part R via the gasket 7, the anchor 80 is inserted into the first to fourth through-holes 40a, 71a, 15 and 7a from the outside. Then, the flange part 81b of the anchor 80 butts against the base end wall 40b of the shared base main body 40, and the stopping part 81a of the anchor 80 is locked to the door mirror attaching part R. Accordingly, since the door mirror base 74 is temporarily attached at the door mirror attaching part R, attachment workability of the door mirror improves.

After the temporary attachment, the attaching screw 61 is threadedly inserted into the screw insertion hole 81c of the anchor 80 from the flange part 81b side until a head part 61b of the attaching screw 61 butts against the flange part 81b of the anchor 80. By threadedly inserting the attaching screw 61, a diameter of the anchor main body part 81 is increased, and the outer circumferential surface of the anchor main body part 81 is pressed against the shared base main body 40, the exclusive spacer 71 and the door mirror attaching part R. In particular, the diameter is increased such that the distal end side of the anchor main body part 81 is widened, and in combination with the stoppage by the stopping part 81a, the door mirror base 74 is firmly fixed to the door mirror attaching part R while it becomes extremely hard for the anchor 80 to fall out.

By employing such a fixing means 75, a good effect is exhibited to facilitate sharing of the fixing means 75 with respect to the door mirror attaching part R having various inclined angles. Further, even when an auxiliary spacer 44 (see FIG. 7) is not used, the fixing means 75 can be easily applied to the door mirror attaching part R having various inclined angles.

Figure 9:
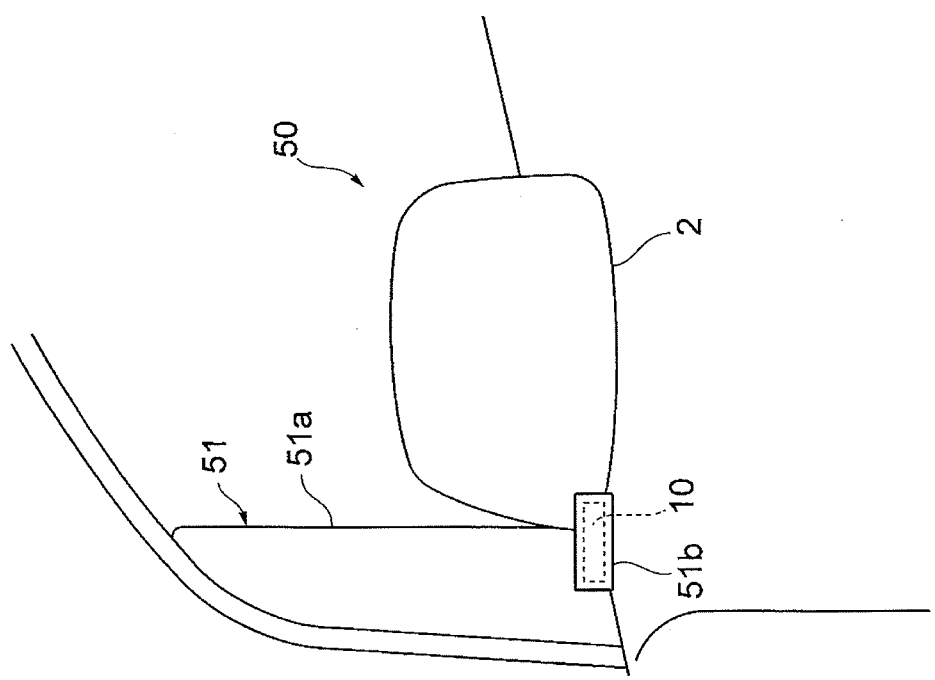
FIG. 9 is a perspective view showing a sixth variant of the door mirror according to the present invention.

A cover member 51 of a door mirror 50 shown in FIG. 9 includes a main body part 51a elongated in the vertical direction, and a base surrounding part 51b configured to cover the shared base main body 10.

A door mirror 90 shown in FIG. 10 is fixed under a window W of the door D, and a cover member 91 covers a periphery of the shared base main body 10.

The base surrounding parts 6b and 51b of the cover members 6 and 51 may be integrally formed with the main body parts 6a and 51a or may be formed separately therefrom.

The door mirror main body 2 may or may not be shared.

The above-mentioned door mirror 1, 50 or 90 is an example of the outer mirror, and an outer mirror attached to an A pillar, a fender, or the like instead of the door may be provided, in addition to the door mirror attached to the door.

INDUSTRIAL APPLICABILITY

An aspect of the present invention enables sharing of the base main body to which the outer mirror main body is attached.

REFERENCE SIGNS LIST 1, 50, 90 . . . door mirror (outer mirror) 2 . . . door mirror main body (outer mirror main body) 3 . . . door mirror base (outer mirror base) 7 . . . gasket 10 . . . shared base main body 11, 21 . . . exclusive spacer 11a, 21a . . . inner abutting surface 11b, 21b . . . outer abutting surface 13 . . . attaching screw 30 . . . shared base main body 31 . . . exclusive spacer 31a . . . screw through-hole 32 . . . attaching screw 40 . . . shared base main body 40a, 41a . . . screw through-hole 41 . . . exclusive spacer 42 . . . attaching screw 61 . . . attaching screw 71 . . . exclusive spacer 75 . . . fixing means 80 . . . anchor D . . . door R . . . door mirror attaching part (outer mirror attaching part)

What is claimed is:

1. An outer mirror in which an outer mirror main body is attached to an outer mirror attaching part of a vehicle body via an outer mirror base, the outer mirror base comprising:
 a shared base main body configured to support the outer mirror main body; and
 an exclusive spacer having one end abutting the shared base main body and the other end pressed against the outer mirror attaching part of the vehicle body via a gasket,
 wherein the exclusive spacer abuts and is fixed to the shared base main body, and an attaching screw passing through the outer mirror attaching part is threadedly attached to the exclusive spacer.

2. An outer mirror in which an outer mirror main body is attached to an outer mirror attaching part of a vehicle body via an outer mirror base, the outer mirror base comprising:
 a shared base main body configured to support the outer mirror main body; and
 an exclusive spacer having one end abutting the shared base main body and the other end pressed against the outer mirror attaching part of the vehicle body via a gasket,
 wherein the exclusive spacer abuts and is fixed to the shared base main body, and an attaching screw passing through the outer mirror attaching part is fixed to the exclusive spacer.

3. An outer mirror in which an outer mirror main body is attached to an outer mirror attaching part of a vehicle body via an outer mirror base, the outer mirror base comprising:
 a shared base main body configured to support the outer mirror main body; and
 an exclusive spacer having one end abutting the shared base main body and the other end pressed against the outer mirror attaching part of the vehicle body via a gasket,
 wherein a screw through-hole is provided in the exclusive spacer, and an attaching screw passes through the outer mirror attaching part and the screw through-hole, and is threadedly attached or fixed to the shared base main body.

4. An outer mirror in which an outer mirror main body is attached to an outer mirror attaching part of a vehicle body via an outer mirror base, the outer mirror base comprising:
 a shared base main body configured to support the outer mirror main body; and
 an exclusive spacer having one end abutting the shared base main body and the other end pressed against the outer mirror attaching part of the vehicle body via a gasket,
 wherein fixing means is configured to fix the outer mirror base to the outer mirror attaching part comprises:
 an anchor passing through the shared base main body and the exclusive spacer to reach the outer mirror attaching part; and
 an attaching screw threadedly inserted into the anchor while expanding the anchor and configured to press an outer circumferential surface of the anchor against the shared base main body, the exclusive spacer and the outer mirror attaching part.

* * * * *